United States Patent
Ruhlmann et al.

(10) Patent No.: US 7,217,761 B2
(45) Date of Patent: May 15, 2007

(54) NON-IONIC THICKENERS FOR PIGMENT COMPOSITIONS, IN PARTICULAR FOR PAINTS AND APPLICATIONS THEREOF

(75) Inventors: Denis Ruhlmann, Genay (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 10/480,251

(22) PCT Filed: Jun. 6, 2002

(86) PCT No.: PCT/FR02/01939

§ 371 (c)(1), (2), (4) Date: Apr. 2, 2004

(87) PCT Pub. No.: WO02/102868

PCT Pub. Date: Dec. 27, 2002

(65) Prior Publication Data

US 2004/0147672 A1     Jul. 29, 2004

(30) Foreign Application Priority Data

Jun. 19, 2001 (FR) .................................. 01 08062

(51) Int. Cl.
- *C08G 18/00* (2006.01)
- *C08G 18/08* (2006.01)
- *C08J 3/00* (2006.01)
- *C08K 3/20* (2006.01)
- *C08L 75/00* (2006.01)

(52) U.S. Cl. ...................... 524/591; 524/507; 524/589; 524/590; 524/839; 524/840; 528/44; 528/49; 528/59; 528/74; 528/76; 528/79; 528/85

(58) Field of Classification Search ................ 524/589, 524/590, 591, 839, 840, 507; 528/44, 49, 528/59, 74, 76, 79, 85
See application file for complete search history.

(56) References Cited

U.S. PATENT DOCUMENTS

| | | | |
|---|---|---|---|
| 4,079,028 A | 3/1978 | Emmons et al. | |
| 4,564,632 A * | 1/1986 | Nonn et al. | 514/522 |
| 6,093,764 A | 7/2000 | Egraz et al. | |

FOREIGN PATENT DOCUMENTS

| | | |
|---|---|---|
| DE | 41 01 239 | 4/1992 |
| EP | 0 537 900 | 4/1993 |
| JP | 03 064309 | 3/1991 |
| JP | 11 263961 | 9/1999 |
| JP | 11-263961 A * | 9/1999 |
| JP | 2001 303461 | 10/2001 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

The invention relates to the use of a compound with an alkylene oxide chain as a thickener of aqueous compositions, containing a filler and/or pigmented, white or colored, with the aim of supplying pigmentary compositions for paint which provide excellent pigmentary compatibility and a high viscosity at small and medium shear stress gradient.

The invention also relates to the said non-ionic thickener as well as the aqueous composition, containing a filler and/or pigmented, white or colored, containing same.

30 Claims, No Drawings

NON-IONIC THICKENERS FOR PIGMENT COMPOSITIONS, IN PARTICULAR FOR PAINTS AND APPLICATIONS THEREOF

TECHNICAL SECTOR OF THE INVENTION

The present invention relates to the technical sector of pigmentary compositions and in particular pigmentary compositions for paints and similar compositions, and still more precisely the pigmentary bases for paint intended for colouring.

TECHNICAL PROBLEM POSED

In the field of many pigmentary compositions, but more especially in that of pigmentary compositions and bases for paint, the Theological profile of the composition or of the base plays a part, the base being the white-coloured aqueous composition containing a filler, the base of the coloured or pigmented pigmentary composition.

This white-coloured aqueous composition, containing a filler and/or pigmented, is formed from a liquid phase which can be water or an organic solvent miscible with water or else a mixture of the two, one or more polymers in suspension in the liquid phase called "binders", fillers and/or pigments, at least one dispersing agent for the fillers and/or pigments which can be a hydrosoluble polymer or hydrosoluble copolymer, additives as diverse as coalescence agents, biocides, antifoaming agents or others, and finally at least one thickening agent which is a natural or synthetic polymer or copolymer.

The rheological profile is well known to persons skilled in the art, and is represented by the curve of the viscosity η as a function of the velocity gradient D.

Without duplicating what is known to persons skilled in the art, it will be indicated quickly that:

$$\eta(Pa \cdot s) = Stress(Pa)/Gradient\ D\ (s-1)$$

The stress is a measure of the pressure applied to the composition or to the base (unless specifically indicated, the term "composition" will be used in the following to designate any composition, or any base for paint or the like, which is aqueous, containing a filler and/or pigmented, as defined above).

In the field of paints, the following must be obtained simultaneously (which represents the major difficulty):
  good "dynamic" performance, that is to say low viscosity at large gradient (which in practice represents the requirement of low viscosity at application of the paint on the substrate, the application naturally implying a high shear stress)

and
  good "static" performance, that is to say under storage conditions, which in practice amounts to desiring high viscosity (and other desired "in the pot" properties) which provides good storage and "pot life" conditions at small or medium velocity gradient.

One important quality of white pigmentary compositions is judged when, precisely, its coloured pigmentary component is added to it. As a general rule, the intensity of the colour of the composition is increased when the pigment concentration is increased.

However, a significant problem appears in the presence of shear stress, that is to say very precisely under the conditions of application of a paint to its substrate, since a dissociation of the pigment or pigments from the remainder of the composition can occur. Persons skilled in the art call this characteristic "colour acceptance", which here will be called "pigmentary compatibility" of the composition concerned.

In practice, if the final paint composition (and/or the base for paint referred to as "white base" since it does not yet contain the coloured pigment or pigments) has an inadequate pigmentary compatibility, application will bring about a dissociation or heterogeneity of the composition, and therefore different colour density areas, for example streaks which are less dense in terms of colour, which is obviously not the aim sought.

The invention therefore aims to propose white bases and/or pigmentary compositions for paint (together below, including in the claims, as already indicated, "compositions") having very good compatibility with the pigmentary colourants, on both matt paints and silk finish paints.

The invention aims in particular to supply compositions which provide excellent pigmentary compatibility and have a high viscosity at small and medium shear stress gradient also referred to as velocity gradient, on both matt paints and silk finish paints, that is to say in particular in a field of velocity gradient D lying between:

0 and 20 s−1 approximately ("small" velocity gradient)

and 100 s−1 approximately ("medium" velocity gradient).

White bases contain, as known to persons skilled in the art, fillers such as carbonates, in particular calcium carbonates, a titanium oxide, kaolin, and well-known similar fillers, usable according to the invention.

Pigmentary colourants are also well known to persons skilled in the art, and are for example chosen from amongst carbon black, phthalocyanine blue, iron oxides (which give yellow, red. etc tones), and diazo salts.

The carrying out is also known of a simple and practical test, referred to as a "test of rubbing with the finger", known to persons skilled in the art by the term "rub out" which will be used hereinafter. This test correctly reproduces the shear stress brought about by application with a brush or the like.

The test consists of applying a coat of paint to a substrate with no shear stress, that is to say slowly and with no stress, and then of applying shear stress by a rotary movement of a finger applied to the said coat of paint.

If the composition has a good or very good pigmentary compatibility, the colour intensity on the area rubbed by the finger will remain constant or "homogeneous" compared with the non-rubbed area; in the contrary case, the rubbed area will have a heterogeneity of colour intensity compared with the non-treated area.

This heterogeneity will be expressed by a colorimetric difference measured by means of a spectrocolorimeter called Spectro-pen™.

PRIOR ART

To date, compositions effective at small velocity gradient are known, but in acrylic copolymer chemistry, referred to as ionic thickeners, as opposed to the so-called non-ionic thickeners.

Their major drawback is the fact that the formulation must be made at a pH higher than 7 since the acrylic thickeners must be neutralised in order to be effective.

Another drawback lies in the fact that the introduction of the said acrylic thickeners into an aqueous paint reduces the water resistance of the said paints.

Yet another drawback is the fact that these products have a low propensity for spreading, which is obviously a serious drawback in the field of paints and similar products.

Finally, the acrylic associative polymer type products are highly sensitive to salts. Polyurethane thickeners are also known which make it possible to obtain, in an aqueous paint, high viscosities at large velocity gradient but which are not capable of developing high Brookfield™ viscosities.

Generally these products are functionalised with short hydrocarbon chain ends, that is to say ones having fewer than 14 carbon atoms. These compounds have the advantage of retaining a certain pigmentary compatibility but do not allow high Brookfield™ viscosities to be obtained at small shear stress gradient.

Moreover, polyurethanes developing high Brookfield™ viscosities at small shear stress gradient are known (Synthesis and Characterization of Model Associative Polymers, Richard D. Jenkins, David R. Bassett, Cesar A. Silebi and Mohamed S. El-Aasser, J. of Applied Polymer Science, vol. 58, p 209–230 (1995); Polymeric Mat. Sci. and Engineering, vol. 59, p 1033 (1988); Polymeric Mat. Sci. and Engineering, vol. 61, p 533 (1989); Polymeric Paint Colour Journal, vol. 176, n° 4169, p 459 (June 1986)).

It has now been demonstrated that the greater the increase in the number of carbon atoms present in the hydrocarbon chains functionalising the polyurethane chains, the greater the increase in the Brookfield™ viscosities at small shear stress gradient.

These said polyurethanes, providing high Brookfield™ viscosities at small shear stress gradient, have the major drawback of dramatically reducing pigmentary compatibility in the aqueous formulations into which they are introduced.

As it has been said, the invention aims in particular to supply compositions which provide an excellent pigmentary compatibility and have a high viscosity at small and medium shear stress gradient, on both matt paints and silk finish paints, and do not have the drawbacks connected with the use of so-called ionic acrylic copolymers, namely the obligation of making the formulation at a pH greater than 7, their low water resistance, or their low propensity for spreading, or finally their very high sensitivity to salts.

The invention therefore aims to solve a particularly difficult problem often encountered by the user.

There therefore exists an important and recognised requirement for non-ionic thickeners which would make it possible to prepare "compositions" (in the general sense given above, and especially white bases, in particular for paint) having simultaneously a high Brookfield™ viscosity at small shear stress gradient and an excellent pigmentary compatibility, on both matt paints and silk finish paints.

At present no product exists combining these two qualities simultaneously on both matt paints and silk finish paints.

As will be seen below, the invention not only provides a solution to this problem, but in addition proposes thickeners which are better thickeners than those of the prior art.

The invention relates in its general principle to molecules which are thickeners having the above properties, and which are of the type of a polymer with an alkylene oxide chain, in particular an ethylene oxide (EO) chain or an ethylene oxide and propylene oxide (PO) chain, characterised in that they are based on polyisocyanate units and in particular diisocyanate units and have, at the chain end, hydrocarbon groups themselves having at least three aromatic cycles, substituted or not.

Of course thickeners having hydrocarbon groups at the chain end are already known, these groups having fairly large chain lengths and sometimes aromatic or cyclic groups, but the invention has been able to define the above selection criteria.

These thickeners are non-ionic.

DETAILED DESCRIPTION OF THE INVENTION

The invention relates in particular to thickeners fitting the formula (I) below:

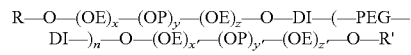

in which:

DI is a diisocyanate group such as toluene diisocyanate, isophorone diisocyanate or hexaamethylene diisocyanate;

PEG is a polyethylene glycol group of molecular weight ranging from 6,000 to 20,000;

n is between 1 and 40;

x, z, x', z' are between 1 and 40;

y, y' are between 0 and 40;

with $x+y+z+x'+y'+z'$ between 2 and 80.

According to one preferred embodiment, the molecular weight of the PEG is between 6,000 and 15,000, preferably close to 10,000.

According to yet another preferred embodiment, n is close to 1.

According to yet another preferred embodiment, $x+y+z+x'+y'+z'$ is between 2 and approximately 50 with $y=y'=z=z'=0$.

According to one altogether preferred embodiment, $x=x'=1.3$.

According to one altogether preferred embodiment, $n=x=x'=1$ and $y=y'=z'=0$.

R or R' are hydrocarbon groups having at least three aromatic cycles, substituted or not, and are different or identical.

It should be noted that the associative polymers, known in the prior art, are not suitable: for example, a product functionalised with a group having 8 carbon atoms, which is a pure associative, certainly gives a suitable pigmentary compatibility, but it is not a suitable thickener, and by a long way, at small or medium shear stress gradient.

Furthermore, if an attempt is made to increase the chain length beyond 8 carbon atoms, the viscosity at small or medium gradient is indeed increased, which was foreseeable, but the pigmentary compatibility is progressively lost.

The invention therefore carries out a selection which is well defined in terms of both chemical definition and surprising properties.

According to one preferred embodiment, the R group will be a tristyrylphenyl (TSP) group with formula:

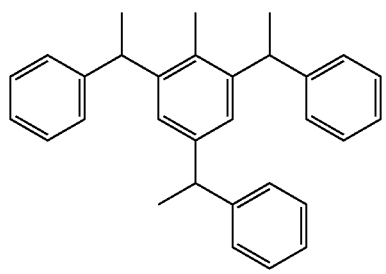

with $x+x'+y+y'+z+z'$ between 2 and 80.

According to another preferred embodiment, the R group will be a distyrylphenyl (DSP) group with formula:

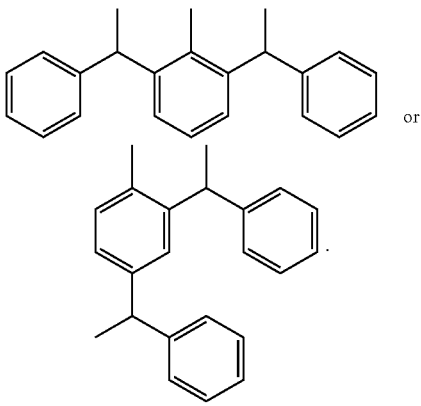

or

According to yet another embodiment of the invention, the R group is substituted.

The substituents of the R group are preferably chosen from amongst the following groups: phenyls, benzyls or alkyls, linear or branched, having any number whatsoever of carbon atoms.

According to yet another preferred embodiment, the said substituent or substituents are disposed on the aromatic groups, themselves possibly substituted.

According to one altogether preferred embodiment, one of the phenyl groups of the TSP group is itself substituted by at least one phenyl group.

One advantageous case according to the invention is the one where one of the styryl groups of the TSP group is itself substituted by a styryl group, the R group then being a tetrastyrylphenyl group.

The case where the TSP is substituted on a phenyl by a cyclohexanyl group has already been mentioned above.

The invention also relates to the use of the compound according to the invention as a thickener of aqueous compositions, containing a filler and/or pigmented, white or coloured.

Finally, the invention relates to aqueous compositions, containing a filler and/or pigmented, white or coloured, containing the thickening compound according to the invention.

The thickening compound according to the invention is introduced into the said compositions at the rate of 0.1% to 2.0%, preferentially at the rate of 0.2% to 1.0%, a quantity expressed as a percentage by dry weight with respect to the total mass of the composition.

The aqueous compositions, containing a filler and/or pigmented, white or coloured, according to the invention are characterised in that they contain the thickening copolymer according to the invention, preferably at the rate of 0.1% to 2.0%, and very preferentially at the rate of 0.2% to 1.0%, a quantity expressed as a percentage by dry weight with respect to the total mass of the composition.

In the field of paints, the Brookfield™ viscosity measurements, well known to persons skilled in the art, are commonly used.

The measurements at "small" shear stress gradient correspond to velocities of the apparatus set at 10 and 100 revolutions/minute.

These various Brookfield™ viscosity measurements are performed after 24 hours of storage at rest, 1 week of storage at rest and 1 month of storage at rest.

Measurement of the Stormer viscosity (expressed in Krebs Units "KU") is also used. These measurements are also well known to persons skilled in the art. This Stormer viscosity applies to the measurements at "medium" shear stress gradient.

Industry is interested firstly by a viscosity as high as possible at small shear stress gradient (pot life), and low at large gradient (application). The most important measurement will therefore be the Brookfield™ viscosity at 10 revolutions/min.

However, for certain special paints, it is advantageous to have a Stormer viscosity as high as possible (therefore at medium gradient).

The aqueous compositions, containing a filler and/or pigmented, white or coloured, according to the invention are characterised in that they contain the thickening copolymer according to the invention, preferably at the rate of 0.1% to 2.0%, and very preferentially at the rate of 0.2% to 1.0%, a quantity expressed as a percentage by dry weight with respect to the total mass of the composition, and in that the value of the sum of the notations ($\Delta E_{matt}+\Delta E_{silk}+\eta_{matt}+\eta_{silk}$) is greater than or equal to 3 and very preferentially equal to 4, with the following notations, namely:

for the matt formulations; the values:
- +1, if the Brookfield™ viscosity after 24 hours (denoted $\eta_{matt}$) at 10 rev/min. is greater than or equal to 3,000 mPa·s,
- 0, if the Brookfield™ viscosity after 24 hours (denoted $\eta_{matt}$) at 10 rev/min. is between 800 inclusive and 3,000 mPa·s exclusive,
- −1, if the Brookfield™ viscosity after 24 hours (denoted $\eta_{matt}$) at 10 rev/min. is less than 800 mPa·s, and
- +1, if $\Delta E_{matt}<1$
- 0, if $\Delta E_{matt}$ is between 1 and 2 inclusive
- −1, if $\Delta E_{matt}>2$ for the silk finish formulations, the values:
- +1, if the Brookfield™ viscosity after 24 hours (denoted $\eta_{silk}$) at 10 rev/min. is greater than or equal to 2,000 mPa·s,
- 0, if the Brookfield™ viscosity after 24 hours (denoted $\eta_{silk}$) at 10 rev/min. is between 800 inclusive and 2,000 mPa·s exclusive,
- −1, if the Brookfield™ viscosity after 24 hours (denoted $\eta_{silk}$) at 10 rev/min. is less than 800 mPa·s, and
- +1, if $\Delta E_{silk}<1.5$
- 0, if $\Delta E_{silk}$ is between 1.5 and 3 inclusive
- −1, if $\Delta E_{silk}>3$ The determination of the value of Delta E ($\Delta E$) of the matt or silk finish coloured aqueous formulation is performed by addition, to the white base, of 5% by weight black pigment, that is to say 10 g. of black pigment (COLANYL™ Black marketed by CLARIANT) in 190 g. of white paint.

This $\Delta E$ measurement test is the one already aforementioned and called "test of rubbing with the finger", known to persons skilled in the art by the term "rub out".

This test consists of applying with no shear stress, by means of a filmograph, 150 micrometers of the formulation of the coloured matt or silk finish paint to be tested onto a contrast card, that is to say slowly and with no stress, and of waiting 45 seconds and then applying shear stress by rubbing, with the finger, the still viscous film of paint, for thirty seconds in any place whatsoever.

After drying of the film, the colorimetric difference between the shear-stressed area (rubbed area) and the non-shear-stressed area (area of the non-rubbed film), determined by means of the spectrocolorimeter called Spectro-pen, makes it possible to evaluate (value of $\Delta E$) whether or not the paint composition tested has a good pigmentary compatibility.

The invention will be better understood from a reading of the following description, and the non-limiting examples below.

EXAMPLE 1

The aim of this example is to reveal the rheological and pigmentary compatibility properties provided by the thickening agents according to the invention for matt formulations for paint, with solvent and at constant dosage.

These formulations for paints comprise the ingredients and additives listed in the first part of Tables 1a, 1b and 1c constituting the white base, and which persons skilled in the art will recognise.

In this first part of Tables 1a, 1b and 1c:
COATEX P 90 designates a polyacrylate type dispersant marketed by COATEX under the name COATEX P 90.
Byk 034™ designates an antifoaming agent marketed by BYK.
Monoethylene glycol is a coalescence agent.
The product Mergal K6N™ designates a biocide agent marketed by TROY.
The product $TiO_2$ RL 68 is a titanium oxide marketed by MILLENNIUM.
The product Hydrocarb™ is a known fine filler of the natural $CaCO_3$ type, marketed by OMYA.
The product Durcal™ is a coarser filler, also known, of the natural $CaCO_3$ type, marketed by OMYA.
Rhodopas DS 910™ is a styrene-acrylic binder marketed by RHODIA.
The product "White spirit" is a well-known petroleum fraction which has a solvent function.

For each test, preparation was carried out of the aforementioned matt paint formulation, into which the thickening agent to be tested is added.

Then, for each of the tests, the Brookfield™ and Stormer viscosity measurements of the formulation obtained are carried out.

These Brookfield™ viscosity measurements are performed, by means of an RVT type Brookfield™ viscometer equipped with the appropriate mobile, on each of the samples representative of the different tests after 24 hours of storage at ambient temperature (denoted viscosity T=24 h), after 1 week of storage at ambient temperature (denoted viscosity T=1 week), after 1 week of storage in an oven at 50° C. (denoted viscosity T=1 week 50° C.), after 1 month of storage at ambient temperature (denoted viscosity T=1 month), and after 1 month of storage in an oven at 50° C. (denoted viscosity T=1 month 50° C.).

The Stormer viscosities expressed in Krebs Units (KU) are determined by means of a Stormer viscometer.

In the second part of Tables 1a, 1b and 1c, entitled pigmentary compatibility, the L and Delta E results appear.

L determined by the use of the Spectro-pen™ spectrocolorimeter measures the whiteness of the formulation applied on the contrast card. The closer the values get to 100, the poorer the compatibility is. This value appears only by way of illustration.

Test 1:
This test illustrates the prior art and uses 0.57% by dry weight, with respect to the total weight of the formulation, of a well-known polyurethane based on the condensation product of an alcohol having 16 carbon atoms, toluene diisocyanate and polyethylene glycol of molecular weight equal to 10,000.

Test 2:
This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=1;
y=y'=z=z'=0;
R=R'=TSP.

Test 3:
This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=1.3;
y=y'=z=z'=0;
R=R'=TSP.

Test 4:
This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=5;
y=y'=z=z'=0;
R=R'=TSP.

Test 5:
This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=15;
y=y'=z=z'=0;
R=R'=TSP.

Test 6:
This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=25;
y=y'=z=z'=0;
R=R'=TSP.

Test 7:
This test illustrates the invention and uses 0.57% by dry weight, with respect to the total weight of the formulation, of a compound with formula (I) in which:
DI is isophorone diisocyanate;

PEG is a polyethylene glycol of molecular weight equal to 10,000;
n=1;
x=x'=40;
y=y'=z=z'=0;
R=R'=TSP.

Test 8:

This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=15;
y=y'=z=z'=0;
R=R'=DSP.

Test 9:

This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=7;
y=y'=z=z'=0;
R=R'=DSP.

Test 10:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=23;
y=y'=z=z'=0;
R=R'=linear alkyl chain with 12 carbon atoms.

Test 11:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=25;
y=y'=z=z'=0;
R=R'=linear alkyl chain consisting of a fraction of 16 to 18 carbon atoms.

Test 12:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=20;
y=y'=z=z'=0;
R=R'=linear alkyl chain with 18 carbon atoms.

Test 13:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=25;
y=y'=z=z'=0;
R=R'=linear alkyl chain with 22 carbon atoms.

Test 14:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=25;
y=y'=z=z'=0;
R=R'=branched alkyl chain with 32 carbon atoms.

Test 15:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=30;
y=y'=z=z'=0;
R=R'=nonylphenyl group.

Test 16:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=20;
y=y'=z=z'=0;
R=R'=abietate group.

Test 17:

This test illustrates the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=z'=8.3;
x'=z=0;
y=y'=12.8;
R=R'=TSP.

Test 18:

This test illustrates a field outside the invention and uses 0.57% by dry weight, with respect to the total weight of the formulation, of a compound with formula (I) in which:
DI is isophorone diisocyanate;
PEG is a polyethylene glycol of molecular weight equal to 10,000;
n=1;
x=x'=6.4;
y=y'=z=z'=0;
R=R'=beta-naphthyl group.

Test 19:

This test illustrates the invention and uses 0.57% by dry weight, with respect to the total weight of the formulation, of a compound with formula (I) in which:
DI is isophorone diisocyanate;

PEG is a polyethylene glycol of molecular weight equal to 6,000;
n=1;
x=x'=1.3;
y=y'=z=z'=0;
R=R'=TSP.

Test 20:

This test illustrates the invention and uses 0.57% by dry weight, with respect to the total weight of the formulation, of a compound with formula (I) in which:
DI is isophorone diisocyanate;
PEG is a polyethylene glycol of molecular weight equal to 8,000;
n=1;
x=x'=1.3;
y=y'=z=z'=0;
R=R'=TSP.

Test 21:

This test illustrates the invention and uses 0.57% by dry weight, with respect to the total weight of the formulation, of a compound with formula (I) in which:
DI is isophorone diisocyanate;
PEG is a polyethylene glycol of molecular weight equal to 20,000;
n=1;
x=x'=1.3;
y=y'=z=z'=0;
R=R'=TSP.

Test 22:

This test illustrates the invention and uses 0.57% by dry weight, with respect to the total weight of the formulation, of a compound with formula (I) in which:
DI is toluene diisocyanate;
PEG is a polyethylene glycol of molecular weight equal to 10,000;
n=1;
x=x'=1.3;
y=y'=z=z'=0;
R=R'=TSP.

All the Brookfield™ viscosity (at 10 and 100 rev/min.) and Stormer viscosity results, as well as the values of L and Delta E (ΔE), for pigmented base formulations and relating to the aforementioned tests are summed up in the following Tables 1a, 1b and 1c.

TABLE 1a

| | Prior art | Invention | Invention | Invention | Invention | Invention | Invention | Invention | Invention |
|---|---|---|---|---|---|---|---|---|---|
| | | | | | TEST N° | | | | |
| | 1 | 2 | 3 | 4 | 5 | 6 | 7 | 8 | 9 |
| Untreated water | 276.9 | 272 | 272 | 272 | 272 | 272 | 272 | 272 | 272 |
| Coatex P90 (40%) | 3 | 3 | 3 | 3 | 3 | 3 | 3 | 3 | 3 |
| Liquid ammonia (28%) | 2.3 | 2.3 | 2.3 | 2.3 | 2.3 | 2.3 | 2.3 | 2.3 | 2.3 |
| Byk 034 | 1 | 1 | 1 | 1 | 1 | 1 | 1 | 1 | 1 |
| Monoethylene glycol | 10.2 | 10.2 | 10.2 | 10.2 | 10.2 | 10.2 | 10.2 | 10.2 | 10.2 |
| Mergal K6N | 2 | 2 | 2 | 2 | 2 | 2 | 2 | 2 | 2 |
| TiO2 RL 68 | 40 | 40 | 40 | 40 | 40 | 40 | 40 | 40 | 40 |
| Hydrocarb | 207 | 207 | 207 | 207 | 207 | 207 | 207 | 207 | 207 |
| Durcal 2 | 316 | 316 | 316 | 316 | 316 | 316 | 316 | 316 | 316 |
| Rhodopas DS 910 | 120 | 120 | 120 | 120 | 120 | 120 | 120 | 120 | 120 |
| White Spirit | 10.2 | 10.2 | 10.2 | 10.2 | 10.2 | 10.2 | 10.2 | 10.2 | 10.2 |
| Thickeners | C16 | TSP | TSP | TSP | TSP | TSP | TSP | DSP | DSP |
| | OE = 0 | OE1 | OE1.3 | OE5 | OE15 | OE25 | OE40 | OE15 | OE7 |
| Quantity (g) | 11.4 | 16.3 | 16.3 | 16.3 | 16.3 | 16.3 | 16.3 | 16.3 | 16.3 |
| Total (g) | 1000 | 1000 | 1000 | 1000 | 1000 | 1000 | 1000 | 1000 | 1000 |
| % dry thickener/total formulation | 0.57 | 0.57 | 0.57 | 0.57 | 0.57 | 0.57 | 0.57 | 0.57 | 0.57 |
| pH | 9.1 | 9.1 | 9.1 | 9.1 | 9.1 | 9.1 | 9.1 | 9.1 | 9.1 |
| Brookfield viscosity (mPa · s) T = 24 h | | | | | | | | | |
| 10 rev/min | 12300 | 17300 | 31500 | 12500 | 3600 | 2400 | 1300 | 1100 | 4800 |
| 100 rev/min | 2800 | 5900 | 11400 | 5700 | 2700 | 1800 | 900 | 800 | 3500 |
| Stormer visco. (KU) | 107 | 122 | >141 | 122 | 104 | 95 | 82 | 81 | 109 |
| Brookfield viscosity (mPa · s) T = 1 week | | | | | | | | | |
| 10 rev/min | 12400 | 17800 | 30900 | 11000 | 3700 | 2700 | 1400 | 1000 | 5300 |
| 100 rev/min | 2800 | 5990 | 10100 | 5400 | 2600 | 1900 | 900 | 800 | 3600 |
| Stormer visco. (KU) | 104 | 124 | >141 | 125 | 108 | 99 | 87 | 84 | 111 |
| Brookfield viscosity (mPa · s) T = 1 week 50° C. | | | | | | | | | |
| 10 rev/min | 12500 | 12400 | 27100 | 10900 | 3200 | 2100 | 1000 | 1100 | 5600 |
| 100 rev/min | 3400 | 5100 | 9000 | 5100 | 2500 | 1500 | 700 | 800 | 3700 |
| Stormer visco. (KU) | 111 | 122 | >141 | 124 | 106 | 97 | 84 | 87 | 118 |
| Brookfield viscosity (mPa · s) T = 1 month | | | | | | | | | |
| 10 rev/min | 12600 | 18100 | 32100 | 12900 | 3900 | 2600 | 1300 | 1200 | 6100 |

TABLE 1a-continued

| | Prior art | Invention | Invention | Invention | Invention TEST N° | Invention | Invention | Invention | Invention |
|---|---|---|---|---|---|---|---|---|---|
| | 1 | 2 | 3 | 4 | 5 | 6 | 7 | 8 | 9 |
| 100 rev/min | 2900 | 6000 | 12000 | 5600 | 2800 | 2000 | 1100 | 800 | 3700 |
| Stormer visco. (KU) | 106 | 125 | >141 | 126 | 107 | 101 | 89 | 83 | 116 |
| Brookfield viscosity (mPa · s) T = 1 month 50° C. | | | | | | | | | |
| 10 rev/min | 13100 | 15600 | 33400 | 11600 | 3800 | 2900 | 1200 | 1400 | 6400 |
| 100 rev/min | 3600 | 6200 | 11200 | 5200 | 2700 | 2100 | 800 | 900 | 3900 |
| Stormer visco. (KU) | 115 | 128 | >141 | 127 | 110 | 103 | 88 | 91 | 121 |
| Pigmentary compatibility (addition of 5% by weight of black pigmentary paste) | | | | | | | | | |
| Delta E | 8.2 | 0.6 | 0.5 | 0.6 | 0.4 | 0.5 | 0.7 | 0.9 | 0.6 |
| L | 40.3 | 28.7 | 29.4 | 29.2 | 28.7 | 28.5 | 28.6 | 28.3 | 29.2 |

TABLE 1b

| | Outside invention | Outside invention | Outside invention | Outside invention | Outside invention TEST N° | Outside invention | Outside invention | Invention | Outside invention |
|---|---|---|---|---|---|---|---|---|---|
| | 10 | 11 | 12 | 13 | 14 | 15 | 16 | 17 | 18 |
| Untreated water | 272 | 272 | 272 | 272 | 272 | 272 | 272 | 272 | 272 |
| Coatex P90 (40%) | 3 | 3 | 3 | 3 | 3 | 3 | 3 | 3 | 3 |
| Liquid ammonia (28%) | 2.3 | 2.3 | 2.3 | 2.3 | 2.3 | 2.3 | 2.3 | 2.3 | 2.3 |
| Byk 034 | 1 | 1 | 1 | 1 | 1 | 1 | 1 | 1 | 1 |
| Monoethylene glycol | 10.2 | 10.2 | 10.2 | 10.2 | 10.2 | 10.2 | 10.2 | 10.2 | 10.2 |
| Mergal K6N | 2 | 2 | 2 | 2 | 2 | 2 | 2 | 2 | 2 |
| TiO2 RL 68 | 40 | 40 | 40 | 40 | 40 | 40 | 40 | 40 | 40 |
| Hydrocarb | 207 | 207 | 207 | 207 | 207 | 207 | 207 | 207 | 207 |
| Durcal 2 | 316 | 316 | 316 | 316 | 316 | 316 | 316 | 316 | 316 |
| Rhodopas DS 910 | 120 | 120 | 120 | 120 | 120 | 120 | 120 | 120 | 120 |
| White Spirit | 10.2 | 10.2 | 10.2 | 10.2 | 10.2 | 10.2 | 10.2 | 10.2 | 10.2 |
| Thickeners | C12 OE23 | C16C18 OE25 | C18 OE20 | C22 OE25 | C32 OE25 | NP30 | Abietate | TSPOE8.3 OP 12.8 | Beta N. OE 6.4 |
| Quantity (g) | 16.3 | 16.3 | 16.3 | 16.3 | 16.3 | 16.3 | 16.3 | 16.3 | 16.3 |
| Total (g) | 1000 | 1000 | 1000 | 1000 | 1000 | 1000 | 1000 | 1000 | 1000 |
| % dry thickener/total formulation | 0.57 | 0.57 | 0.57 | 0.57 | 0.57 | 0.57 | 0.57 | 0.57 | 0.57 |
| pH | 9.1 | 9.1 | 9.1 | 9.1 | 9.1 | 9.1 | 9.1 | 9.1 | 9.1 |
| Brookfield viscosity (mPa · s) T = 24 h | | | | | | | | | |
| 10 rev/min | 1000 | 4100 | 29500 | 9700 | 400 | 600 | 400 | 1000 | 300 |
| 100 rev/min | 500 | 2800 | 11300 | 2400 | 200 | 400 | 300 | 700 | 200 |
| Stormer visco. (KU) | 73 | 102 | >141 | 100 | 63 | 69 | 64 | 72 | 63 |
| Brookfield viscosity (mPa · s) T = 1 week | | | | | | | | | |
| 10 rev/min | 1100 | 4600 | 30400 | 10100 | 400 | 700 | 500 | 1100 | 400 |
| 100 rev/min | 600 | 2900 | 11600 | 2600 | 200 | 400 | 400 | 700 | 300 |
| Stormer visco. (KU) | 77 | 106 | >141 | 110 | 65 | 71 | 69 | 74 | 65 |
| Brookfield viscosity (mPa · s) T = 1 week 50° C. | | | | | | | | | |
| 10 rev/min | 1300 | 4900 | 35400 | 12600 | 400 | 800 | 500 | 1300 | 400 |
| 100 rev/min | 700 | 3200 | 13100 | 3100 | 300 | 400 | 300 | 800 | 200 |
| Stormer visco. (KU) | 81 | 110 | >141 | 116 | 69 | 75 | 69 | 79 | 67 |
| Brookfield viscosity (mPa · s) T = 1 month | | | | | | | | | |
| 10 rev/min | 1200 | 5800 | 31800 | 11000 | 500 | 900 | 400 | 1100 | 600 |
| 100 rev/min | 700 | 3300 | 12700 | 2800 | 200 | 500 | 300 | 900 | 400 |
| Stormer visco. (KU) | 79 | 117 | >141 | 115 | 68 | 75 | 66 | 73 | 67 |

TABLE 1b-continued

|  | Outside invention | Outside invention | Outside invention | Outside invention | Outside invention | Outside invention | Outside invention | Invention | Outside invention |
|---|---|---|---|---|---|---|---|---|---|
|  | | | | | TEST N° | | | | |
|  | 10 | 11 | 12 | 13 | 14 | 15 | 16 | 17 | 18 |
| Brookfield viscosity (mPa·s) T = 1 month 50° C. | | | | | | | | | |
| 10 rev/min | 1600 | 5300 | 37800 | 13100 | 500 | 1000 | 500 | 1200 | 500 |
| 100 rev/min | 900 | 3400 | 14000 | 3300 | 400 | 600 | 300 | 900 | 300 |
| Stormer visco. (KU) | 85 | 113 | >141 | 121 | 71 | 77 | 68 | 81 | 69 |
| Pigmentary compatibility (addition of 5% by weight of black pigmentary paste) | | | | | | | | | |
| Delta E | 1.2 | 1.5 | 1.1 | 2.4 | 2.1 | 0.7 | 0.5 | 0.8 | 0.6 |
| L | 27.4 | 29.0 | 30.2 | 33.7 | 30.2 | 26.6 | 28.3 | 27.6 | 28.8 |

TABLE 1c

| TEST N° | Invention 19 | Invention 20 | Invention 21 | Invention 22 |
|---|---|---|---|---|
| Untreated water | 272 | 272 | 272 | 272 |
| Coatex P90 (40%) | 3 | 3 | 3 | 3 |
| Liquid ammonia (28%) | 2.3 | 2.3 | 2.3 | 2.3 |
| Byk 034 | 1 | 1 | 1 | 1 |
| Monoethylene glycol | 10.2 | 10.2 | 10.2 | 10.2 |
| Mergal K6N | 2 | 2 | 2 | 2 |
| TiO2 RL 68 | 40 | 40 | 40 | 40 |
| Hydrocarb | 207 | 207 | 207 | 207 |
| Durcal 2 | 316 | 316 | 316 | 316 |
| Rhodopas DS 910 | 120 | 120 | 120 | 120 |
| White Spirit | 10.2 | 10.2 | 10.2 | 10.2 |
| Thickeners | TSP OE1.3 | TSP OE1.3 | TSP OE1.3 | TSP OE1.3 |
| Quantity (g) | 16.3 | 16.3 | 16.3 | 16.3 |
| Total (g) | 1000 | 1000 | 1000 | 1000 |
| % dry thickener/total formulation | 0.57 | 0.57 | 0.57 | 0.57 |
| pH | 9.6 | 9.6 | 9.6 | 9.6 |
| Brookfield viscosity (mPa·s) T = 24 h  10 rev/min | 11300 | 26100 | 3800 | 1400 |
| 100 rev/min | 3200 | 8700 | 2000 | 1100 |
| Stormer visco. (KU) | 113 | 141 | 92 | 81 |
| Brookfield viscosity (mPa·s) T = 1 week  10 rev/min | 9000 | 22300 | 2300 | 1000 |
| 100 rev/min | 2700 | 7100 | 1600 | 700 |
| Stormer visco. (KU) | 101 | 133 | 89 | 78 |
| Brookfield viscosity (mPa·s) T = 1 week 50° C.  10 rev/min | 9700 | 18500 | 2100 | 500 |
| 100 rev/min | 2900 | 6300 | 1500 | 300 |
| Stormer visco. (KU) | 105 | 137 | 91 | 72 |
| Brookfield viscosity (mPa·s) T = 1 month  10 rev/min | 9100 | 22100 | 2400 | 1000 |
| 100 rev/min | 2600 | 7200 | 1500 | 600 |
| Stormer visco. (KU) | 100 | 131 | 88 | 76 |
| Brookfield viscosity (mPa·s) T = 1 month 50° C.  10 rev/min | 10500 | 19700 | 1900 | 300 |
| 100 rev/min | 3500 | 6300 | 1300 | 200 |
| Stormer visco. (KU) | 107 | 138 | 92 | 70 |
| Pigmentary compatibility (addition of 5% by weight of black pigmentary paste) | | | | |
| Delta E | 0.3 | 0.2 | 0.5 | 0.7 |
| L | 29.3 | 29.0 | 28.0 | 28.2 |

A reading of Tables 1a, 1b and 1c makes it possible to assign the notations $\Delta E_{matt}$ and $\eta_{matt}$ to the different tests. Thus, for Test 1: the notation $\eta_{matt}$ is equal to +1 and the notation $\Delta E_{matt}$ is equal to −1 giving a total ($\Delta E_{matt} + \eta_{matt}$) equal to 0;

for Test 2: the notation $\eta_{matt}$ is equal to +1 and the notation $\Delta E_{matt}$ is equal to +1 giving a total ($\Delta E_{matt} + \eta_{matt}$) equal to 2;

for Test 3: the notation $\eta_{matt}$ is equal to +1 and the notation $\Delta E_{matt}$ is equal to +1 giving a total ($\Delta E_{matt} + \eta_{matt}$) equal to 2;

for Test 4: the notation $\eta_{matt}$ is equal to +1 and the notation $\Delta E_{matt}$ is equal to +1 giving a total ($\Delta E_{matt} + \eta_{matt}$) equal to 2;

for Test 5: the notation $\eta_{matt}$ is equal to +1 and the notation $\Delta E_{matt}$ is equal to +1 giving a total ($\Delta E_{matt} + \eta_{matt}$) equal to 2;

for Test 6: the notation $\eta_{matt}$ is equal to 0 and the notation $\Delta E_{matt}$ is equal to +1 giving a total ($\Delta E_{matt}+\eta_{matt}$) equal to 1;

for Test 7: the notation $\eta_{matt}$ is equal to 0 and the notation $\Delta E_{matt}$ is equal to +1 giving a total ($\Delta E_{matt}+\eta_{matt}$) equal to 1;

for Test 8: the notation $\eta_{matt}$ is equal to 0 and the notation $\Delta E_{matt}$ is equal to +1 giving a total ($\Delta E_{matt}+\eta_{matt}$) equal to 1;

for Test 9: the notation $\eta_{matt}$ is equal to +1 and the notation $\Delta E_{matt}$ is equal to +1 giving a total ($\Delta E_{matt}+\eta_{matt}$) equal to 2;

for Test 10: the notation $\eta_{matt}$ is equal to 0 and the notation $\Delta E_{matt}$ is equal to 0 giving a total ($\Delta_{matt}+\eta_{matt}$) equal to 0;

for Test 11: the notation $\eta_{matt}$ is equal to +1 and the notation $\Delta E_{matt}$ is equal to 0 giving a total ($\Delta E_{matt}+\eta_{matt}$) equal to 1;

for Test 12: the notation $\eta_{matt}$ is equal to +1 and the notation $\Delta E_{matt}$ is equal to 0 giving a total ($\Delta E_{matt}+\eta_{matt}$) equal to +1;

for Test 13: the notation $\eta_{matt}$ is equal to +1 and the notation $\Delta E_{matt}$ is equal to −1 giving a total ($\Delta E_{matt}+\eta_{matt}$) equal to 0;

for Test 14: the notation $\eta_{matt}$ is equal to −1 and the notation $\Delta E_{matt}$ is equal to −1 giving a total ($\Delta E_{matt}+\eta_{matt}$) equal to −2;

for Test 15: the notation $\eta_{matt}$ is equal to −1 and the notation $\Delta E_{matt}$ is equal to +1 giving a total ($\Delta E_{matt}+\eta_{matt}$) equal to 0;

for Test 16: the notation $\eta_{matt}$ is equal to −1 and the notation $\Delta E_{matt}$ is equal to +1 giving a total ($\Delta E_{matt}+\eta_{matt}$) equal to 0;

for Test 17: the notation $\eta_{matt}$ is equal to 0 and the notation $\Delta E_{matt}$ is equal to +1 giving a total ($\Delta E_{matt}+\eta_{matt}$) equal to 1;

for Test 18: the notation $\eta_{matt}$ is equal to −1 and the notation $\Delta E_{matt}$ is equal to +1 giving a total ($\Delta E_{matt}+\eta_{matt}$) equal to 0;

for Test 19: the notation $\eta_{matt}$ is equal to +1 and the notation $\Delta E_{matt}$ is equal to +1 giving a total ($\Delta E_{matt}+\eta_{matt}$) equal to +2;

for Test 20: the notation $\eta_{matt}$ is equal to +1 and the notation $\Delta E_{matt}$ is equal to +1 giving a total ($\Delta E_{matt}+\eta_{matt}$) equal to +2;

for Test 21: the notation $\eta_{matt}$ is equal to +1 and the notation $\Delta E_{matt}$ is equal to +1 giving a total ($\Delta E_{matt}+\eta_{matt}$) equal to +2;

for Test 22: the notation $\eta_{matt}$ is equal to 0 and the notation $\Delta E_{matt}$ is equal to +1 giving a total ($\Delta E_{matt}+\eta_{matt}$) equal to +1.

EXAMPLE 2

The aim of this example is to reveal the rheological and pigmentary compatibility properties provided by the thickening agents according to the invention for silk finish formulations for paint, with solvent and at constant dosage.

These formulations for paints comprise the ingredients and additives listed in the first part of Tables 2a, 2b and 2c constituting the white base, and which persons skilled in the art will recognise.

In this first part of Tables 2a, 2b and 2c:

COATEX BR3 designates a polyacrylate type dispersant marketed by COATEX under the name COATEX BR3.

Tego 1488 designates an antifoaming agent marketed by TEGO.

BDG designates butyldiglycol which is a coalescence agent.

MPG designates monopropylene glycol which is a coalescence agent.

The product Mergal K6™ designates a biocide agent marketed by TROY.

The product Hydrocarb™ is a known fine filler of the natural $CaCO_3$ type, marketed by OMYA.

The product $TiO_2$ RHD2 is a titanium oxide marketed by ELEMENTIS.

Acronal 290D™ is a styrene-acrylic binder marketed by BASF.

Texanol marketed by EASTMAN CHEMICAL is a well-known petroleum fraction which has a solvent function.

For each test, preparation was carried out of the aforementioned silk finish paint formulation, into which the thickening agent to be tested is added.

Then for each of the tests, the Brookfield™ and Stormer viscosity measurements of the formulation obtained are carried out according to the same conditions and the same equipment used in Example 1.

The same applies for the determination of the value of $\Delta E$ on the black pigmentary paste obtained by addition of 5% by weight of the same black pigmentary paste as in the previous example, on the white bases to be tested.

Test 23:

This test illustrates the prior art and uses 0.22% by dry weight, with respect to the total weight of the formulation, of a well-known polyurethane based on the condensation product of an alcohol having 16 carbon atoms, toluene diisocyanate and polyethylene glycol of molecular weight equal to 10,000.

Test 24:

This test illustrates the invention and uses 0.22% by dry weight, with respect to the total weight of the formulation, of a compound with formula (I) in which:

DI is isophorone diisocyanate;

PEG is a polyethylene glycol of molecular weight equal to 10,000;

n=1;

x=x'=1;

y=y'=z=z'=0;

R=R'=TSP.

Test 25:

This test illustrates the invention and uses 0.22% by dry weight, with respect to the total weight of the formulation, of a compound with formula (I) in which:

DI is isophorone diisocyanate;

PEG is a polyethylene glycol of molecular weight equal to 10,000;

n=1;

x=x'=1.3;

y=y'=z=z'=0;

R=R'=TSP.

Test 26:

This test illustrates the invention and uses 0.22% by dry weight, with respect to the total weight of the formulation, of a compound with formula (I) in which:

DI is isophorone diisocyanate;

PEG is a polyethylene glycol of molecular weight equal to 10,000;

n=1;

x=x'=5;

y=y'=z=z'=0;

R=R'=TSP.

Test 27:

This test illustrates the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=15$;
$y=y'=z=z'=0$;
$R=R'=$TSP.

Test 28:

This test illustrates the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=25$;
$y=y'=z=z'=0$;
$R=R'=$TSP.

Test 29:

This test illustrates the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=40$;
$y=y'=z=z'=0$;
$R=R'=$TSP.

Test 30:

This test illustrates the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=15$;
$y=y'=z=z'=0$;
$R=R'=$DSP.

Test 31:

This test illustrates the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=7$;
$y=y'=z=z'=0$;
$R=R'=$DSP.

Test 32:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=23$;
$y=y'=z=z'=0$;
$R=R'=$linear alkyl chain with 12 carbon atoms.

Test 33:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=25$;
$y=y'=z=z'=0$;
$R=R'=$linear alkyl chain consisting of a fraction of 16 to 18 carbon atoms.

Test 34:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=20$;
$y=y'=z=z'=0$;
$R=R'=$linear alkyl chain with 18 carbon atoms.

Test 35:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=25$;
$y=y'=z=z'=0$;
$R=R'=$linear alkyl chain with 22 carbon atoms.

Test 36:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=25$;
$y=y'=z=z'=0$;
$R=R'=$branched alkyl chain with 32 carbon atoms.

Test 37:

This test illustrates a field outside the invention and uses 0.22% by dry weight, with respect to the total weight of the formulation, of a compound with formula (1) in which:
DI is isophorone diisocyanate;
PEG is a polyethylene glycol of molecular weight equal to 10,000;
$n=1$;
$x=x'=30$;
$y=y'=z=z'=0$;
$R=R'=$nonylphenyl group.

Test 38:

This test illustrates a field outside the invention and uses 0.22% by dry weight, with respect to the total weight of the formulation, of a compound with formula (I) in which:
DI is isophorone diisocyanate;
PEG is a polyethylene glycol of molecular weight equal to 10,000;
$n=1$;
$x=x'=20$;
$y=y'=z=z'=0$;
$R=R'=$abietate group.

Test 39:

This test illustrates the invention and uses 0.22% by dry weight, with respect to the total weight of the formulation, of a compound with formula (I) in which:

DI is isophorone diisocyanate;
PEG is a polyethylene glycol of molecular weight equal to 10,000;
$n=1$;
$x=z'=8.3$;
$x'=z=0$;
$y=y'=12.8$;
$R=R'=TSP$.

Test 40:

This test illustrates a field outside the invention and uses 0.22% by dry weight, with respect to the total weight of the formulation, of a compound with formula (I) in which:

DI is isophorone diisocyanate;
PEG is a polyethylene glycol of molecular weight equal to 10,000;
$n=1$;
$x=x'=6.4$;
$y=y'=z=z'=0$;
$R=R'=$beta-naphthyl group.

Test 41:

This test illustrates the invention and uses 0.22% by dry weight, with respect to the total weight of the formulation, of a compound with formula (I) in which:

DI is isophorone diisocyanate;
PEG is a polyethylene glycol of molecular weight equal to 6,000;
$n=1$;
$x=x'=1.3$;
$y=y'=z=z'=0$;
$R=R'=TSP$.

Test 42:

This test illustrates the invention and uses 0.22% by dry weight, with respect to the total weight of the formulation, of a compound with formula (I) in which:

DI is isophorone diisocyanate;
PEG is a polyethylene glycol of molecular weight equal to 8,000;
$n=1$;
$x=x'=1.3$;
$y=y'=z=z'=0$;
$R=R'=TSP$.

Test 43:

This test illustrates the invention and uses 0.22% by dry weight, with respect to the total weight of the formulation, of a compound with formula (I) in which:

DI is isophorone diisocyanate;
PEG is a polyethylene glycol of molecular weight equal to 20,000;
$n=1$;
$x=x'=1.3$;
$y=y'=z=z'=0$;
$R=R'=TSP$.

Test 44:

This test illustrates the invention and uses 0.22% by dry weight, with respect to the total weight of the formulation, of a compound with formula (I) in which:

DI is toluene diisocyanate;
PEG is a polyethylene glycol of molecular weight equal to 10,000;
$n=1$;
$x=x'=1.3$;
$y=y'=z=z'=0$;
$R=R'=TSP$.

All the Brookfield™ viscosity (at 10 and 100 rev/min.) and Stormer viscosity results, as well as the values of L and Delta E, for pigmented base formulations and relating to the aforementioned tests, are summed up in the following Tables 2a, 2b and 2c.

TABLE 2a

| | Prior art | Invention | Invention | Invention | Invention | Invention | Invention | Invention | Invention |
|---|---|---|---|---|---|---|---|---|---|
| | \multicolumn{9}{c}{TEST N°} | | | | | | | | |
| | 23 | 24 | 25 | 26 | 27 | 28 | 29 | 30 | 31 |
| Untreated water | 135.5 | 133.6 | 133.6 | 133.6 | 133.6 | 133.6 | 133.6 | 133.6 | 133.6 |
| Coatex BR3 (40%) | 5 | 5 | 5 | 5 | 5 | 5 | 5 | 5 | 5 |
| Tego 1488 | 2 | 2 | 2 | 2 | 2 | 2 | 2 | 2 | 2 |
| B.D.G | 25 | 25 | 25 | 25 | 25 | 25 | 25 | 25 | 25 |
| M.P.G | 15 | 15 | 15 | 15 | 15 | 15 | 15 | 15 | 15 |
| Mergal K6N | 3 | 3 | 3 | 3 | 3 | 3 | 3 | 3 | 3 |
| TiO2 RHD2 | 200 | 200 | 200 | 200 | 200 | 200 | 200 | 200 | 200 |
| Hydrocarb | 150 | 150 | 150 | 150 | 150 | 150 | 150 | 150 | 150 |
| Acronal 290D | 450 | 450 | 450 | 450 | 450 | 450 | 450 | 450 | 450 |
| Texanol | 10 | 10 | 10 | 10 | 10 | 10 | 10 | 10 | 10 |
| Thickeners | C16 | TSP | TSP | TSP | TSP | TSP | TSP | DSP | DSP |
| | OE = 0 | OE1 | OE1.3 | OE5 | OE15 | OE25 | OE40 | OE15 | OE7 |
| Quantity (g) | 4.5 | 6.4 | 6.4 | 6.4 | 6.4 | 6.4 | 6.4 | 6.4 | 6.4 |
| Total (g) | 1000 | 1000 | 1000 | 1000 | 1000 | 1000 | 1000 | 1000 | 1000 |
| % dry thickener/total formulation | 0.22 | 0.22 | 0.22 | 0.22 | 0.22 | 0.22 | 0.22 | 0.22 | 0.22 |
| pH | 8.5 | 8.5 | 8.5 | 8.5 | 8.5 | 8.5 | 8.5 | 8.5 | 8.5 |
| Brookfield viscosity (mPa · s) T = 24 h | | | | | | | | | |
| 10 rev/min | 7700 | 14800 | 21600 | 10000 | 4100 | 3300 | 2400 | 2400 | 5300 |
| 100 rev/min | 3500 | 6000 | 8700 | 4900 | 2000 | 1600 | 1100 | 1000 | 2600 |
| Stormer visco. (KU) | 106 | 125 | 140 | 121 | 97 | 92 | 82 | 80 | 101 |

TABLE 2a-continued

|  | Prior art | Invention | Invention | Invention | Invention TEST N° | Invention | Invention | Invention | Invention |
|---|---|---|---|---|---|---|---|---|---|
|  | 23 | 24 | 25 | 26 | 27 | 28 | 29 | 30 | 31 |
| Brookfield viscosity (mPa · s) T = 1 week | | | | | | | | | |
| 10 rev/min | 7400 | 15200 | 22100 | 9800 | 4500 | 3600 | 2600 | 2900 | 5900 |
| 100 rev/min | 3500 | 6000 | 8800 | 4900 | 2200 | 1700 | 1000 | 1100 | 2800 |
| Stormer visco. (KU) | 106 | 124 | 139 | 120 | 101 | 95 | 82 | 80 | 103 |
| Brookfield viscosity (mPa · s) T = 1 week 50° C. | | | | | | | | | |
| 10 rev/min | 8600 | 16700 | 23500 | 12100 | 5200 | 4100 | 3300 | 3600 | 6400 |
| 100 rev/min | 3800 | 6700 | 9200 | 5500 | 2500 | 1800 | 1200 | 1300 | 3300 |
| Stormer visco. (KU) | 113 | 135 | >141 | 130 | 106 | 100 | 86 | 83 | 107 |
| Brookfield viscosity (mPa · s) T = 1 month | | | | | | | | | |
| 10 rev/min | 7600 | 15400 | 22800 | 10200 | 4700 | 4000 | 3000 | 3100 | 6600 |
| 100 rev/min | 3500 | 6100 | 8900 | 5000 | 2200 | 1900 | 1200 | 1200 | 3200 |
| Stormer visco. (KU) | 106 | 125 | 140 | 122 | 104 | 98 | 86 | 81 | 105 |
| Brookfield viscosity (mPa · s) T = 1 month 50° C. | | | | | | | | | |
| 10 rev/min | 8900 | 17400 | 25000 | 12800 | 5500 | 4700 | 3900 | 4400 | 7100 |
| 100 rev/min | 4100 | 6900 | 9600 | 5500 | 2600 | 2000 | 1500 | 1400 | 3500 |
| Stormer visco. (KU) | 115 | 140 | >141 | 131 | 110 | 105 | 91 | 89 | 111 |
| Pigmentary compatibility (addition of 5% by weight of black pigmentary paste) | | | | | | | | | |
| Delta E | 16.2 | 0.4 | 0.4 | 0.5 | 0.4 | 1.1 | 1.3 | 1.3 | 0.7 |
| L | 58.1 | 39.9 | 39.5 | 39.6 | 38.6 | 38.8 | 38.7 | 38.8 | 39.2 |

TABLE 2b

|  | Outside invention | Outside invention | Outside invention | Outside invention | Outside invention TEST N° | Outside invention | Outside invention | Invention | Outside invention |
|---|---|---|---|---|---|---|---|---|---|
|  | 32 | 33 | 34 | 35 | 36 | 37 | 38 | 39 | 40 |
| Untreated water | 133.6 | 133.6 | 133.6 | 133.6 | 133.6 | 133.6 | 133.6 | 133.6 | 133.6 |
| Coatex BR3 (40%) | 5 | 5 | 5 | 5 | 5 | 5 | 5 | 5 | 5 |
| Tego 1488 | 2 | 2 | 2 | 2 | 2 | 2 | 2 | 2 | 2 |
| B.D.G | 25 | 25 | 25 | 25 | 25 | 25 | 25 | 25 | 25 |
| M.P.G | 15 | 15 | 15 | 15 | 15 | 15 | 15 | 15 | 15 |
| Mergal K6N | 3 | 3 | 3 | 3 | 3 | 3 | 3 | 3 | 3 |
| TiO2 RHD2 | 200 | 200 | 200 | 200 | 200 | 200 | 200 | 200 | 200 |
| Hydrocarb | 150 | 150 | 150 | 150 | 150 | 150 | 150 | 150 | 150 |
| Acronal 290D | 450 | 450 | 450 | 450 | 450 | 450 | 450 | 450 | 450 |
| Texanol | 10 | 10 | 10 | 10 | 10 | 10 | 10 | 10 | 10 |
| Thickeners | C12 OE23 | C16C18 OE25 | C18 OE20 | C22 OE25 | C32 OE25 | NP30 | Abiétate | TSPOE8.3 OP 12.8 | Béta N. OE 6.4 |
| Quantity (g) | 6.4 | 6.4 | 6.4 | 6.4 | 6.4 | 6.4 | 6.4 | 6.4 | 6.4 |
| Total (g) | 1000 | 1000 | 1000 | 1000 | 1000 | 1000 | 1000 | 1000 | 1000 |
| % dry thickener/total formulation | 0.22 | 0.22 | 0.22 | 0.22 | 0.22 | 0.22 | 0.22 | 0.22 | 0.22 |
| pH | 8.5 | 8.5 | 8.5 | 8.5 | 8.5 | 8.5 | 8.5 | 8.5 | 8.5 |
| Brookfield viscosity (mPa · s) T = 24 h | | | | | | | | | |
| 10 rev/min | 1600 | 2400 | 6300 | 6600 | 3300 | 1300 | 1100 | 2700 | 1200 |
| 100 rev/min | 600 | 1300 | 3200 | 2100 | 800 | 500 | 400 | 1400 | 400 |
| Stormer visco. (KU) | 70 | 83 | 106 | 91 | 70 | 65 | 63 | 84 | 68 |

TABLE 2b-continued

|  | Outside invention | Outside invention | Outside invention | Outside invention | Outside invention TEST N° | Outside invention | Outside invention | Invention | Outside invention |
|---|---|---|---|---|---|---|---|---|---|
|  | 32 | 33 | 34 | 35 | 36 | 37 | 38 | 39 | 40 |
| Brookfield viscosity (mPa · s) T = 1 week |  |  |  |  |  |  |  |  |  |
| 10 rev/min | 1700 | 2800 | 7100 | 7300 | 3400 | 1700 | 1300 | 2700 | 1400 |
| 100 rev/min | 650 | 1300 | 3400 | 2200 | 1000 | 800 | 500 | 1500 | 500 |
| Stormer visco. (KU) | 72 | 84 | 106 | 92 | 74 | 71 | 66 | 84 | 71 |
| Brookfield viscosity (mPa · s) T = 1 week 50° C. |  |  |  |  |  |  |  |  |  |
| 10 rev/min | 2200 | 3500 | 7900 | 10200 | 5000 | 1700 | 1500 | 3600 | 2100 |
| 100 rev/min | 800 | 1600 | 3600 | 2600 | 1100 | 600 | 500 | 1700 | 700 |
| Stormer visco. (KU) | 77 | 90 | 114 | 99 | 76 | 68 | 66 | 92 | 75 |
| Brookfield viscosity (mPa · s) T = 1 month |  |  |  |  |  |  |  |  |  |
| 10 rev/min | 2100 | 3400 | 8000 | 8100 | 3700 | 1900 | 1400 | 3100 | 1500 |
| 100 rev/min | 800 | 1700 | 3600 | 2400 | 1100 | 800 | 500 | 1500 | 500 |
| Stormer visco. (KU) | 74 | 89 | 110 | 98 | 76 | 73 | 67 | 85 | 74 |
| Brookfield viscosity (mPa · s) T = 1 month 50° C. |  |  |  |  |  |  |  |  |  |
| 10 rev/min | 2600 | 4200 | 8300 | 12600 | 5800 | 2200 | 1700 | 4400 | 2700 |
| 100 rev/min | 900 | 1900 | 3700 | 2900 | 1400 | 800 | 600 | 1900 | 800 |
| Stormer visco. (KU) | 81 | 96 | 119 | 110 | 83 | 70 | 69 | 101 | 81 |
| Pigmentary compatibility (addition of 5% by weight of black pigmentary paste) |  |  |  |  |  |  |  |  |  |
| Delta E | 1 | 1.7 | 13.4 | 23.2 | 13 | 1.4 | 1.8 | 1.2 | 1.3 |
| L | 38.5 | 40.5 | 52.9 | 62.4 | 53.4 | 38.3 | 37.8 | 38.9 | 38.6 |

TABLE 2c

| TEST N° |  | Invention 41 | Invention 42 | Invention 43 | Invention 44 |
|---|---|---|---|---|---|
| Untreated water |  | 133.6 | 133.6 | 133.6 | 133.6 |
| Coatex BR3 (40%) |  | 5 | 5 | 5 | 5 |
| Tego 1488 |  | 2 | 2 | 2 | 2 |
| B.D.G |  | 25 | 25 | 25 | 25 |
| M.P.G |  | 15 | 15 | 15 | 15 |
| Mergal K6N |  | 3 | 3 | 3 | 3 |
| TiO2 RHD2 |  | 200 | 200 | 200 | 200 |
| Hydrocarb |  | 150 | 150 | 150 | 150 |
| Acronal 290D |  | 450 | 450 | 450 | 450 |
| Texanol |  | 10 | 10 | 10 | 10 |
| Thickeners |  | TSP OE1.3 | TSP OE1.3 | TSP OE1.3 | TSP OE1.3 |
| Quantity (g) |  | 6.4 | 6.4 | 6.4 | 6.4 |
| Total (g) |  | 1000 | 1000 | 1000 | 1000 |
| % dry thickener/total formulation |  | 0.22 | 0.22 | 0.22 | 0.22 |
| pH |  | 8.4 | 8.4 | 8.4 | 8.4 |
| Brookfield viscosity (mPa · s) T = 24 h | 10 rev/min | 20700 | 24800 | 6800 | 5300 |
|  | 100 rev/min | 7600 | 9300 | 2800 | 2300 |
|  | Stormer visco. (KU) | 137 | >141 | 101 | 98 |
| Brookfield viscosity (mPa · s) T = 1 week | 10 rev/min | 20200 | 26300 | 7400 | 5900 |
|  | 100 rev/min | 7400 | 9200 | 2900 | 2600 |
|  | Stormer visco. (KU) | 139 | >141 | 102 | 100 |
| Brookfield viscosity (mPa · s) T = 1 week 50° C. | 10 rev/min | 21500 | 24700 | 8100 | 5800 |
|  | 100 rev/min | 7400 | 9100 | 3100 | 2300 |
|  | Stormer visco. (KU) | >141 | >141 | 108 | 102 |
| Brookfield viscosity (mPa · s) T = 1 month | 10 rev/min | 20500 | 27200 | 7700 | 5800 |
|  | 100 rev/min | 7400 | 9300 | 3100 | 2700 |
|  | Stormer visco. (KU) | 138 | >141 | 103 | 101 |
| Brookfield viscosity | 10 rev/min | 22400 | 25100 | 8500 | 5800 |

TABLE 2c-continued

| TEST N° | | Invention 41 | Invention 42 | Invention 43 | Invention 44 |
|---|---|---|---|---|---|
| (mPa · s) | 100 rev/min | 7600 | 9200 | 3200 | 2400 |
| T = 1 month 50° C. Stormer visco. (KU) | | >141 | >141 | 108 | 102 |
| Pigmentary compatibility (addition of 5% by weight of black pigmentary paste) | | | | | |
| Delta E | | 0.6 | 0.4 | 0.3 | 0.1 |
| L | | 37.5 | 36.6 | 35.4 | 36.0 |

A reading of Tables 2a, 2b and 2c makes it possible to assign the notations $\Delta E_{silk}$ and $\eta_{silk}$ to the different tests. Thus, for Test 23: the notation $\eta_{silk}$ is equal to +1 and the notation $\Delta E_{silk}$ is equal to −1 giving a total ($\Delta E_{silk}+\eta_{silk}$) equal to 0;

for Test 24: the notation $\eta_{silk}$ is equal to +1 and the notation $\Delta E_{silk}$ is equal to +1 giving a total ($\Delta E_{silk}+\eta_{silk}$) equal to +2;

for Test 25: the notation $\eta_{silk}$ is equal to +1 and the notation $\Delta E_{silk}$ is equal to +1 giving a total ($\Delta E_{silk}+\eta_{silk}$) equal to +2;

for Test 26: the notation $\eta_{silk}$ is equal to +1 and the notation $\Delta E_{silk}$ is equal to +1 giving a total ($\Delta E_{silk}+\eta_{silk}$) equal to +2;

for Test 27: the notation $\eta_{matt}$ is equal to +1 and the notation $\Delta_{matt}$ is equal to +1 giving a total ($\Delta E_{matt}+\eta_{matt}$) equal to +2;

for Test 28: the notation $\eta_{silk}$ is equal to +1 and the notation $\Delta E_{silk}$ is equal to +1 giving a total ($\Delta E_{silk}+\eta_{silk}$) equal to 2;

for Test 29: the notation $\eta_{silk}$ is equal to +1 and the notation $\Delta E_{silk}$ is equal to +1 giving a total ($\Delta E_{silk}+\eta_{silk}$) equal to 2;

for Test 30: the notation $\eta_{silk}$ is equal to +1 and the notation $\Delta E_{silk}$ is equal to +1 giving a total ($\Delta E_{silk}+\eta_{silk}$) equal to 2;

for Test 31: the notation $\eta_{silk}$ is equal to +1 and the notation $\Delta E_{silk}$ is equal to +1 giving a total ($\Delta E_{silk}+\eta_{silk}$) equal to 2;

for Test 32: the notation $\eta_{silk}$ is equal to 0 and the notation $\Delta E_{silk}$ is equal to +1 giving a total ($\Delta E_{silk}+\eta_{silk}$) equal to 1;

for Test 33: the notation $\eta_{silk}$ is equal to +1 and the notation $\Delta E_{silk}$ is equal to 0 giving a total ($\Delta E_{silk}+\eta_{silk}$) equal to 1;

for Test 34: the notation $\eta_{silk}$ is equal to +1 and the notation $\Delta E_{silk}$ is equal to −1 giving a total ($\Delta E_{silk}+\eta_{silk}$) equal to 0;

for Test 35: the notation $\eta_{silk}$ is equal to +1 and the notation $\Delta E_{silk}$ is equal to −1 giving a total ($\Delta E_{silk}+\eta_{silk}$) equal to 0;

for Test 36: the notation $\eta_{silk}$ is equal to +1 and the notation $\Delta E_{silk}$ is equal to −1 giving a total ($\Delta E_{silk}+\eta_{silk}$) equal to 0;

for Test 37: the notation $\eta_{silk}$ is equal to 0 and the notation $\Delta E_{silk}$ is equal to +1 giving a total ($\Delta E_{silk}+\eta_{silk}$) equal to 1;

for Test 38: the notation $\eta_{silk}$ is equal to 0 and the notation $\Delta E_{silk}$ is equal to 0 giving a total ($\Delta E_{silk}+\eta_{silk}$) equal to 0;

for Test 39: the notation $\eta_{silk}$ is equal to +1 and the notation $\Delta_{silk}$ is equal to +1 giving a total ($\Delta E_{silk}+\eta_{silk}$) equal to 2;

for Test 40: the notation $\eta_{silk}$ is equal to 0 and the notation $\Delta E_{silk}$ is equal to +1 giving a total ($\Delta E_{silk}+\eta_{silk}$) equal to 1;

for Test 41: the notation $\eta_{silk}$ is equal to +1 and the notation $\Delta E_{silk}$ is equal to +1 giving a total ($\Delta E_{silk}+\eta_{silk}$) equal to +2;

for Test 42: the notation $\eta_{silk}$ is equal to +1 and the notation $\Delta E_{silk}$ is equal to +1 giving a total ($\Delta E_{silk}+\eta_{silk}$) equal to +2;

for Test 43: the notation $\eta_{silk}$ is equal to +1 and the notation $\Delta E_{silk}$ is equal to +1 giving a total ($\Delta E_{silk}+\eta_{silk}$) equal to +2;

for Test 44: the notation $\eta_{silk}$ is equal to +1 and the notation $\Delta E_{silk}$ is equal to +1 giving a total ($\Delta E_{silk}+\eta_{silk}$) equal to +2.

The sum of the totals of the notations of Example 1 relating to matt paints and of Example 2 relating to silk finish paints is summed up in the following Table 3.

TABLE 3

| | R GROUP | x + y + z = x' + y' + z' | MATT PAINT | | | SILK FINISH PAINT | | | TOTAL |
|---|---|---|---|---|---|---|---|---|---|
| | | | Test n° | η matt notation | ΔE matt notation | Test n° | η silk notation | ΔE silk notation | (η matt + ΔE matt) + (η silk + ΔE silk) |
| Prior art | $C_{16}$ | 0 | 1 | +1 | −1 | 19 | +1 | −1 | 0 |
| Invention | TSP | 1 | 2 | +1 | +1 | 20 | +1 | +1 | +4 |
| Invention | TSP | 1.3 | 3 | +1 | +1 | 21 | +1 | +1 | +4 |
| Invention | TSP | 5 | 4 | +1 | +1 | 22 | +1 | +1 | +4 |
| Invention | TSP | 15 | 5 | +1 | +1 | 23 | +1 | +1 | +4 |
| Invention | TSP | 25 | 6 | 0 | +1 | 24 | +1 | +1 | +3 |
| Invention | TSP | 40 | 7 | 0 | +1 | 25 | +1 | +1 | +3 |
| Invention | DSP | 15 | 8 | 0 | +1 | 26 | +1 | +1 | +3 |
| Invention | DSP | 7 | 9 | +1 | +1 | 27 | +1 | +1 | +4 |
| Outside Invention | $C_{12}$ | 23 | 10 | 0 | 0 | 28 | 0 | +1 | +1 |
| Outside Invention | $C_{16}C_{18}$ | 25 | 11 | +1 | 0 | 29 | +1 | 0 | +2 |
| Outside Invention | $C_{18}$ | 20 | 12 | +1 | 0 | 30 | +1 | −1 | +1 |

TABLE 3-continued

|  | R GROUP | x + y + z = x' + y' + z' | MATT PAINT | | | SILK FINISH PAINT | | | TOTAL |
|---|---|---|---|---|---|---|---|---|---|
|  |  |  | Test n° | η matt notation | ΔE matt notation | Test n° | η silk notation | ΔE silk notation | (η matt + ΔE matt) + (η silk + ΔE silk) |
| Outside Invention | $C_{22}$ | 25 | 13 | +1 | −1 | 31 | +1 | −1 | 0 |
| Outside Invention | $C_{32}$ | 25 | 14 | −1 | −1 | 32 | +1 | −1 | −2 |
| Outside Invention | NP | 30 | 15 | −1 | +1 | 33 | 0 | +1 | +1 |
| Outside Invention | Abietate | 20 | 16 | −1 | +1 | 34 | 0 | 0 | 0 |
| Invention | TSP | 21.1 | 17 | 0 | +1 | 35 | +1 | +1 | +3 |
| Outside Invention | β naphthyl | 6.4 | 18 | −1 | +1 | 36 | 0 | +1 | +1 |

A reading of Table 3 makes it possible to see that only the polyurethanes functionalised with groups containing at least three aromatic cycles, that is to say only compounds fitting the formula (I) in which R and R' are hydrocarbon groups having at least three aromatic cycles, substituted or not, make it possible to develop viscosities at important small shear stress gradient without losing pigmentary compatibility, this property being retained whether matt paint or silk finish paint is concerned.

Tests 1–23, 10–32, 11–33, 12–34, 13–35, 14–36, 15–37, 16–38 and 18–40 do not make it possible to achieve the strictly defined criteria (total of notations less than 3) whereas the tests of the invention 2–24, 3–25, 4–26, 5–27, 6–28, 7–29, 8–30, 9–31, 17–39, 19–41, 20–42, 21–43 and 22–44 meet the said criteria (total of notations greater than or equal to 3).

EXAMPLE 3

The aim of this example is to reveal the rheological and pigmentary compatibility properties provided by the thickening agents according to the invention for matt formulations for paint, with solvent at variable dosage and constant rheology.

To do this, for the formulations appearing in Table 4 which follows, the operating methods and equipment used in the various tests of this example are identical to those used in Example 1.

Test 45:
This test illustrates the invention and uses 0.60% by dry weight, with respect to the total weight of the formulation, of a compound with formula (I) in which:
DI is hexamethylene diisocyanate;
PEG is a polyethylene glycol of molecular weight equal to 10,000;
n=1;
x=x'=1.3;
y=y'=z=z'=0;
R=R'=TSP.

Test 46:
This test illustrates the invention and uses 0.75% by dry weight, with respect to the total weight of the formulation, of a compound with formula (I) in which:
DI is toluene diisocyanate;
PEG is a polyethylene glycol of molecular weight equal to 10,000;
n=1;
x=x'=1.3;
y=y'=z=z'=0;
R=R'=TSP.

Test 47:
This test illustrates the invention and uses 0.56% by dry weight, with respect to the total weight of the formulation, of a compound with formula (I) in which:
DI is isophorone diisocyanate;
PEG is a polyethylene glycol of molecular weight equal to 20,000;
n=1;
x=x'=1.3;
y=y'=z=z'=0;
R=R'=TSP.

Test 48:
This test illustrates the invention and uses 0.13% by dry weight, with respect to the total weight of the formulation, of a compound with formula (I) in which:
DI is isophorone diisocyanate;
PEG is a polyethylene glycol of molecular weight equal to 10,000;
n=1;
x=x'=1.3;
y=y'=z=z'=0;
R=R'=TSP.

All the Brookfield™ viscosity (at 10 and 100 rev/min.) and Stormer viscosity results, as well as the values of L and Delta E, for pigmented base formulations and relating to the aforementioned tests, are summed up in the following Table 4.

TABLE 4

| TEST N° | Invention 45 | Invention 46 | Invention 47 | Invention 48 |
|---|---|---|---|---|
| Untreated water | 271.3 | 266.8 | 272.3 | 284.5 |
| Coatex P90 (40%) | 3 | 3 | 3 | 3 |
| NH4OH | 2.3 | 2.3 | 2.3 | 2.3 |
| Mergal K6N | 2 | 2 | 2 | 2 |
| Byk 034 | 1 | 1 | 1 | 1 |
| TiO2 RL 68 | 40 | 40 | 40 | 40 |
| Hydrocarb | 207 | 207 | 207 | 207 |
| Durcal 2 | 316 | 316 | 316 | 316 |
| Rhodopas DS 910 | 120 | 120 | 120 | 120 |

TABLE 4-continued

| TEST N° | | Invention 45 | Invention 46 | Invention 47 | Invention 48 |
|---|---|---|---|---|---|
| Monoethylene glycol | | 10.2 | 10.2 | 10.2 | 10.2 |
| White Spirit | | 10.2 | 10.2 | 10.2 | 10.2 |
| Thickeners | | TSP OE1.3 HDI PEG 10000 | TSP OE1.3 TDI PEG 10000 | TSP OE1.3 IPDI PEG 20000 | TSP OE1.3 IPDI PEG 10000 |
| Quantity of thickener (g) | | 17 | 21.5 | 16 | 3.8 |
| Total (g) | | 1000 | 1000 | 1000 | 1000 |
| % dry thickener/total formulation | | 0.6 | 0.75 | 0.56 | 0.13 |
| pH | | 9.6 | 9.6 | 9.6 | 9.6 |
| Brookfield viscosity | 10 rev/min | 2700 | 2500 | 2800 | 3700 |
| (mPa · s) | 100 rev/min | 2100 | 1500 | 1700 | 900 |
| T = 24 h | Stormer visco. (KU) | 97 | 89 | 88 | 71 |
| Brookfield viscosity | 10 rev/min | 3200 | 3300 | 3100 | 4600 |
| (mPa · s) | 100 rev/min | 2400 | 2100 | 1700 | 1200 |
| T = 1 week | Stormer visco. (KU) | 100 | 86 | 89 | 78 |
| Brookfield viscosity | 10 rev/min | 3500 | 3400 | 2900 | 3900 |
| (mPa · s) | 100 rev/min | 2600 | 2500 | 1800 | 1000 |
| T = week 50° C. | Stormer visco. (KU) | 104 | 91 | 92 | 76 |
| Brookfield viscosity | 10 rev/min | 2800 | 2400 | 2700 | 3200 |
| (mPa · s) | 100 rev/min | 2000 | 1500 | 1500 | 1000 |
| T = 1 month | Stormer visco. (KU) | 96 | 88 | 86 | 75 |
| Brookfield viscosity | 10 rev/min | 3100 | 3200 | 2800 | 3100 |
| (mPa · s) | 100 rev/min | 2400 | 2100 | 1700 | 800 |
| T = 1 month 50° C. | Stormer visco. (KU) | 102 | 90 | 89 | 75 |
| Pigmentary compatibility (addition of 5% by weight of black pigmentary paste) | | | | | |
| Delta E | | 0.3 | 0.4 | 1.4 | 0.3 |
| L | | 31.9 | 32.0 | 30.2 | 32.8 |

A reading of Table 4 makes it possible to assign the notations $\Delta E_{matt}$ and $\eta_{matt}$ to the different tests.

Thus, for Test 45: the notation $\eta_{matt}$ is equal to 0 and the notation $\Delta E_{matt}$ is equal to +1 giving a total ($\Delta E_{matt}+\eta_{matt}$) equal to +1;

for Test 46: the notation $\eta_{matt}$ is equal to 0 and the notation $\Delta E_{matt}$ is equal to +1 giving a total ($\Delta E_{matt}+\eta_{matt}$) equal to +1;

for Test 47: the notation $\eta_{matt}$ is equal to 0 and the notation $\Delta E_{matt}$ is equal to +1 giving a total ($\Delta E_{matt}+\eta_{matt}$) equal to +1;

for Test 48: the notation $\eta_{matt}$ is equal to +1 and the notation $\Delta E_{matt}$ is equal to +1 giving a total ($\Delta E_{matt}+\eta_{matt}$) equal to +2;

EXAMPLE 4

The aim of this example is to reveal the Theological and pigmentary compatibility properties provided by the thickening agents according to the invention for silk finish formulations for paint, with solvent at variable dosage and constant rheology.

To do this, for the formulations appearing in Table 5 which follows, the operating methods and equipment used in the various tests of this example are identical to those used in Example 2.

Test 49:

This test illustrates the invention and uses 0.12% by dry weight, with respect to the total weight of the formulation, of a compound with formula (I) in which:

DI is hexamethylene diisocyanate;
PEG is a polyethylene glycol of molecular weight equal to 10,000;
n=1;
x=x'=1.3;
y=y'=z=z'=0;
R=R'=TSP.

Test 50:

This test illustrates the invention and uses 0.12% by dry weight, with respect to the total weight of the formulation, of a compound with formula (I) in which:

DI is toluene diisocyanate;
PEG is a polyethylene glycol of molecular weight equal to 10,000;
n=1;
x=x'=1.3;
y=y'=z=z'=0;
R=R'=TSP.

Test 5 1:

This test illustrates the invention and uses 0.105% by dry weight, with respect to the total weight of the formulation, of a compound with formula (I) in which:

DI is isophorone diisocyanate;
PEG is a polyethylene glycol of molecular weight equal to 20,000;
x=x'=1.3;
y=y'=z=z'=0;
R=R'=TSP.

Test 52:

This test illustrates the invention and uses 0.04% by dry weight, with respect to the total weight of the formulation, of a compound with formula (I) in which:

DI is isophorone diisocyanate;
PEG is a polyethylene glycol of molecular weight equal to 10,000;
n=1;
x=x'=1.3;

y=y'=z=z'=0;
R=R'=TSP.

All the Brookfield™ viscosity (at 10 and 100 rev/min.) and Stormer viscosity results, as well as the values of L and Delta E, for pigmented base formulations and relating to the aforementioned tests, are summed up in the following Table 5.

for Test 50: the notation $\eta_{silk}$ is equal to +1 and the notation $\Delta E_{silk}$ is equal to +1 giving a total ($\Delta E_{silk}+\eta_{silk}$) equal to +2;

for Test 51: the notation $\eta_{silk}$ is equal to +1 and the notation $\Delta E_{silk}$ is equal to +1 giving a total ($\Delta E_{silk}+\eta_{silk}$) equal to +2;

TABLE 5

| TEST N° | | Invention 49 | Invention 50 | Invention 51 | Invention 52 |
|---|---|---|---|---|---|
| Untreated water | | 136.5 | 136.5 | 137 | 135 |
| Coatex BR 3 (40%) | | 5 | 5 | 5 | 5 |
| Tego 1488 | | 2 | 2 | 2 | 2 |
| B.D.G. | | 25 | 25 | 25 | 25 |
| M.P.G. | | 15 | 15 | 15 | 15 |
| Mergal K6N | | 3 | 3 | 3 | 3 |
| TiO2 RHD2 | | 200 | 200 | 200 | 200 |
| Hydrocarb | | 150 | 150 | 150 | 150 |
| Acronal 290D | | 450 | 450 | 450 | 450 |
| Texanol | | 10 | 10 | 10 | 10 |
| Thickeners | | TSP OE1.3 HDI PEG 10000 | TSP OE1.3 TDI PEG 10000 | TSP OE1.3 IPDI PEG 20000 | TSP OE1.3 IPDI PEG 10000 |
| Quantity of thickener (g) | | 3.5 | 3.5 | 3 | 1 |
| Total (g) | | 1000 | 1000 | 1000 | 1000 |
| % dry thickener/total formulation | | 0.12 | 0.12 | 0.105 | 0.04 |
| pH | | 8.4 | 8.4 | 8.4 | 8.4 |
| Brookfield viscosity | 10 rev/min | 3100 | 2700 | 3000 | 3100 |
| (mPa · s) | 100 rev/min | 1500 | 1100 | 1200 | 1200 |
| T = 24 h | Stormer visco. (KU) | 85 | 79 | 80 | 81 |
| Brookfield viscosity | 10 rev/min | 3400 | 3100 | 3300 | 3200 |
| (mPa · s) | 100 rev/min | 1700 | 1200 | 1300 | 1300 |
| T = 1 week | Stormer visco. (KU) | 86 | 80 | 81 | 81 |
| Brookfield viscosity | 10 rev/min | 4100 | 3400 | 4000 | 3700 |
| (mPa · s) | 100 rev/min | 1900 | 1200 | 1400 | 1400 |
| T = 1 week 50° C. | Stormer visco. (KU) | 92 | 85 | 87 | 86 |
| Brookfield viscosity | 10 rev/min | 3500 | 3500 | 3400 | 3300 |
| (mPa · s) | 100 rev/min | 1800 | 1300 | 1400 | 1300 |
| T = 1 month | Stormer visco. (KU) | 86 | 81 | 82 | 81 |
| Brookfield viscosity | 10 rev/min | 4400 | 3600 | 4200 | 3800 |
| (mPa · s) | 100 rev/min | 2000 | 1200 | 1500 | 1500 |
| T = 1 month 50° C. | Stormer visco. (KU) | 91 | 84 | 88 | 87 |
| Pigmentary compatibility (addition of 5% by weight of black pigmentary paste) | | | | | |
| Delta E | | 0.4 | 0.4 | 0.2 | 0.4 |
| L | | 35.1 | 35.9 | 35.0 | 35.0 |

A reading of Table 5 makes it possible to assign the notations $\Delta_{matt}$ and $\eta_{matt}$ matt to the different tests.

Thus, for Test 49: the notation $\eta_{silk}$ is equal to +1 and the notation $\Delta E_{silk}$ is equal to +1 giving a total ($\Delta E_{silk}+\eta_{silk}$) equal to +2;

for Test 52: the notation $\eta_{silk}$ is equal to +1 and the notation $\Delta E_{silk}$ is equal to +1 giving a total ($\Delta E_{silk}+\eta_{silk}$) equal to +2;

The sum of the totals of the notations of Example 3 relating to matt paints and of Example 4 relating to silk finish paints is summed up in the following Table 6.

TABLE 6

| | | | | MATT PAINT | | | SILK FINISH PAINT | | TOTAL |
|---|---|---|---|---|---|---|---|---|---|
| | R GROUP | x + y + z = x' + y' + z' | Test n° | η matt notation | ΔE matt notation | Test n° | η silk notation | ΔE silk notation | (η matt + ΔE matt) + (η silk + ΔE silk) |
| Invention | TSP | 1.3 | 45 | 0 | +1 | 49 | +1 | +1 | +3 |
| Invention | TSP | 1.3 | 46 | 0 | +1 | 50 | +1 | +1 | +3 |
| Invention | TSP | 1.3 | 47 | 0 | +1 | 51 | +1 | +1 | +3 |
| Invention | TSP | 1.3 | 48 | +1 | +1 | 52 | +1 | +1 | +4 |

A reading of Table 6 makes it possible to see that the compounds according to the invention make it possible to achieve the strictly defined criteria for different doses and more particularly for doses varying from 0.1% to 2% by dry weight of the said thickening compound with respect to the total mass of the composition.

The invention also covers all the embodiments and all the applications which will be directly accessible to persons skilled in the art from a reading of the present application, from their own knowledge, and possibly from simple routine tests.

The invention claimed is:

1. A method of thickening an aqueous composition, comprising:
adding a thickener compound that contains polyalkylene oxide units to an aqueous composition that contains a filler, a pigment or a combination thereof and is white or colored in coloration, said thickener compound being formed by the reaction of the reactive isocyanate groups in a polyisocyanate compound with the hydroxyl groups of polyalkylene oxide compounds and having hydrocarbon groups, each comprised of at least three aromatic rings, on the termini of the polyalkylene oxide units, the thickener compound providing excellent pigmentary compatibility and a high viscosity thickened composition at small and medium shear stress gradients, and the resulting aqueous composition, as a pigmented composition for incorporation into paint formulations, results in a maff or silk finish of a painted object.

2. The method according to claim 1, wherein the thickener compound has formula (I) as follows:

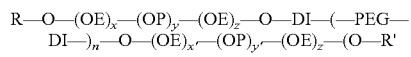
R—O—(OE)$_x$—(OP)$_y$—(OE)$_z$—O—DI—(—PEG—DI—)$_n$—O—(OE)$_{x'}$—(OP)$_{y'}$—(OE)$_{z'}$—(O—R' wherein R and R' are hydrocarbon groups comprised of at least three aromatic rings and are different or identical;
DI is the residue of a diisocyanate compound and
PEG is a polyethylene glycol group of a molecular weight ranging from 6,000 to 20,000, wherein one of the isocyanate groups of a DI unit reacts with a terminal alcohol functional group of the PEG molecule and an isocyanate group of the remaining DI unit reacts with the remaining terminal alcohol functional group of the PEG molecule, thereby forming bonding urethane groups;
n ranges from 1 to 40;
x, z, x', z' each range from 1 to 40;
y and y' each range from 0 to 40;
with x+y+z+x'+y'+z' ranging from 2 to 80.

3. The method according to claim 1, wherein the DI unit is based on a diisocyanate reactant selected from the group consisting of toluene diisocyanate, isophorone diisocyanate and hexamethylene diisocyanate.

4. The method according to claim 2, wherein the PEG component has a molecular weight ranging from 6,000 to 15,000.

5. The method according to claim 4, wherein the PEG component has a molecular weight of about 10,000.

6. The method according to claim 2, wherein the value of n is close to 1.

7. The method according to claim 2, wherein the R and R' groups are each a tristyryiphenyl (TSP) group having the formula:

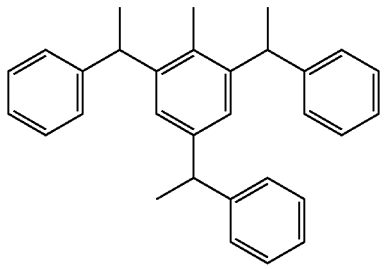

with x+x'+y+y'+z+z' ranges from 2 to 80, or is a distyryiphenyl (DSP) group having the formula:

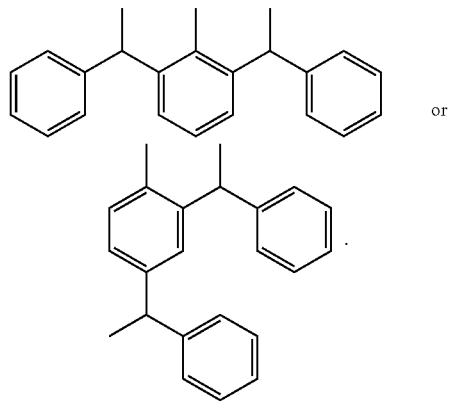

8. The method according to claim 7, wherein the R and R' groups are each TSP and x+y+z+x'+y'+z' ranges from 2 to 50 with y=y'=z=z'=0.

9. The method according to claim 7, wherein x=x'=1.3.

10. The method according to claim 7, wherein n=x=x'=1 and y=y'=z=z'=0.

11. The method according to claim 7, wherein the R and R' groups are substituted by a substituent selected from the group consisting of phenyl, benzyl and linear or branched alkyl.

12. The method according to claim 11, wherein the substituent or substituents are substituted on the aromatic rings.

13. The method according to claim 7, wherein the tristyrylphenyl (TSP) is itself substituted by a styryl group thereby forming a tetrastyrylphenyl group.

14. The method according to claim 7, wherein the tristyryiphenyl (TSP) group is substituted on a styryl group by a cyclohexanyl group.

15. A non-ionic thickener, comprising:
a thickener compound formed by the reaction of the reactive isocyanate groups in a polyisocyanate compound with the hydroxyl groups of polyalkylene oxide compounds and having hydrocarbon groups, each comprised of at least three aromatic rings, on the termini of the polyalkylene oxide units,
wherein the thickener compound has formula (I) as follows:

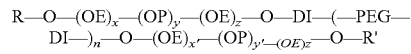
R—O—(OE)$_x$—(OP)$_y$—(OE)$_z$—O—DI—(—PEG—DI—)$_n$—O—(OE)$_{x'}$—(OP)$_{y'}$—(OE)$_{z'}$—O—R' wherein R and R' are hydrocarbon groups comprised of at least three aromatic rings and are different or identical;
DI is the residue of a diisocyanate compound and PEG is a polyethylene glycol group of a molecular weight ranging from 6,000 to 20,000, wherein one of the isocyanate groups of a DI unit reacts with a terminal alcohol functional group of the PEG molecule and an isocyanate group of the remaining DI unit reacts with the remaining terminal alcohol functional group of the PEG molecule, thereby forming bonding urethane groups;

wherein $n=x=x'=1$ and $y=y'=z=z'=0$.

16. The non-ionic thickener according to claim 15, wherein R and R' are hydrocarbon groups comprised of at least three aromatic rings and are identical.

17. The non-ionic thickener according to claim 15, wherein the DI unit is based on a diisocyanate reactant selected from the group consisting of toluene diisocyanate, isophorone diisocyanate and hexamethylene diisocyanate.

18. The non-ionic thickener according to claim 15, wherein the PEG component has a molecular weight ranging from 6,000 to 15,000.

19. The non-ionic thickener according to claim 15, wherein the PEG component has a molecular weight of about 10,000.

20. The non-ionic thickener according to claim 15, wherein the PEG component has a molecular weight of about 6,000 to 8,000.

21. The non-ionic thickener according to claim 15, wherein the R and R' groups are each a tristyrylphenyl (TSP) group having the formula:

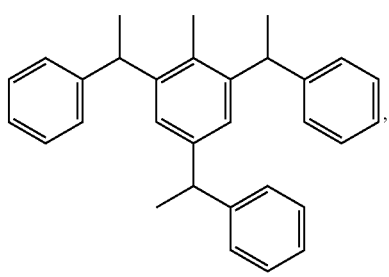

I

, or is a distyrylphenyl (DSP) group having the formula:

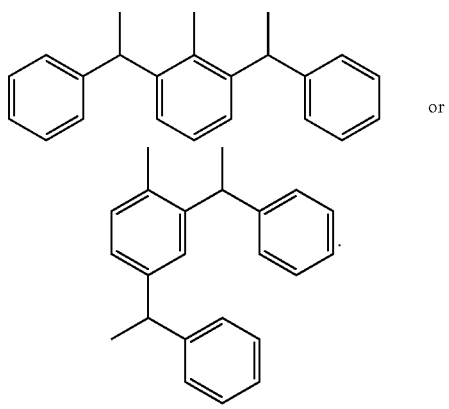

or

.

22. The non-ionic thickener according to claim 21, wherein the R and R' groups are each TSP.

23. The non-ionic thickener according to claim 21, wherein the R and R' groups are each DSP.

24. The non-ionic thickener according to claim 15, wherein R and R' are hydrocarbon groups comprising at least three aromatic rings which are different.

25. The non-ionic thickener according to claim 15, wherein the R and R' groups are substituted by a substituent selected from the group consisting of phenyl, benzyl and linear or branched alkyl.

26. The non-ionic thickener according to claim 15, wherein the substituent or substituents are substituted on the aromatic rings.

27. The non-ionic thickener according to claim 21, wherein the tristyrylphenyl (TSP) is itself substituted by a styryl group thereby forming a tetrastyrylphenyl group.

28. A method of thickening an aqueous composition, comprising:

adding a thickener compound that contains polyalkylene oxide units to an aqueous composition that contains a filler, a pigment or a combination thereof and is white or colored in coloration, said thickener compound having the formula:

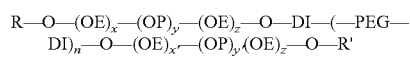

wherein the R and R' groups are each a tristyrylphenyl (TSP) group having the formula:

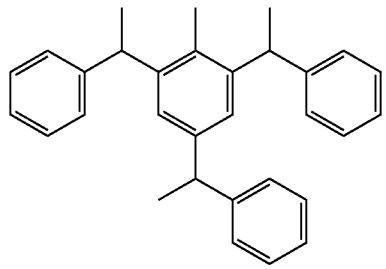

wherein the TSP group is substituted on a styryl group by a cyclohexanyl group,

DI is the residue of a diisocyanate compound and

PEG is a polyethylene glycol group of a molecular weight ranging from 6,000 to 20,000, wherein one of the isocyanate groups of a DI unit reacts with a terminal alcohol functional group of the PEG molecule and an isocyanate group of the remaining DI unit reacts with the remaining terminal alcohol functional group of the PEG molecule, thereby forming bonding urethane groups;

n ranges from 1 to 40;

x, z, x', z' each range from 1 to 40;

y and y' each range from 0 to 40;

with $x+y+z+x'+y'+z'$ ranging from 2 to 80, the thickener compound providing excellent pigmentary compatibility and a high viscosity thickened composition at small and medium shear stress gradients, and the resulting aqueous composition, as a pigmented composition for incorporation into paint formulations, results in a matt or silk finish of a painted object.

29. An aqueous composition containing a filler, a pigment or a combination thereof and the thickening compound of claim 15, in an amount ranging from 0.1 to 2% by dry weight, based on the total weight of the composition.

30. The aqueous composition according to claim 29, wherein the amount of said thickening compound ranges from 0.2 to 1.0% by dry weight.

* * * * *

UNITED STATES PATENT AND TRADEMARK OFFICE
CERTIFICATE OF CORRECTION

PATENT NO. : 7,217,761 B2
APPLICATION NO. : 10/480251
DATED : May 15, 2007
INVENTOR(S) : Denis Ruhlmann et al.

It is certified that error appears in the above-identified patent and that said Letters Patent is hereby corrected as shown below:

Column 1, line 17, "the Theological profile"
should read -- the rheological profile --.

Column 7, line 14, "the Theological and"
should read -- the rheological and --.

Column 18, line 5, "Mergal K6™ designates"
should read -- Mergal K6N™ designates --.

Column 20, line 49, "formula (1) in which:"
should read -- formula (I) in which: --.

Column 27, line 30, "notation $\Delta_{matt}$ is equal to"
should read -- notation $\Delta E_{matt}$ is equal to --.

Column 28, line 30, "notation $\Delta_{silk}$ is equal to"
should read -- notation $\Delta E_{silk}$ is equal to --.

Column 31, TABLE 4, line 23, "T = week 50° C."
should read -- T = 1 week 500 C. --.
line 51, "the Theological and"
should read -- the rheological and --.

Column 32, line 48, " Test 5  1: " should read --Test 51.--;
lines 54-55, "20,000:         should read  -- 20,000:
x=x'=1.3;"                   n=1;
x=x'=1.3; --.

Column 33, line 49, " notations $\Delta_{matt}$ and $\eta_{matt}$ matt to the different tests. "
should read -- notations $\Delta E_{matt}$ and $\eta_{matt}$ to the different tests. --.

Column 35, line 66, " each a tristyryiphenyl (TSP) group "
should read -- each a tristyrylphenyl (TSP) group --.

Column 36, lines 14-15, " or is a distyryiphenyl (DSP) group "
should read -- or is a distyrylphenyl (DSP) group --;
lines 50-51, " wherein the tristyryiphenyl (TSP) group "
should read -- wherein the tristyrylphenyl (TSP) group --;

UNITED STATES PATENT AND TRADEMARK OFFICE
CERTIFICATE OF CORRECTION

PATENT NO. : 7,217,761 B2
APPLICATION NO. : 10/480251
DATED : May 15, 2007
INVENTOR(S) : Denis Ruhlmann et al.

It is certified that error appears in the above-identified patent and that said Letters Patent is hereby corrected as shown below:

Column 36 (Cont'd)
lines 62-63, " R—O—(OE)$_x$—(OP)$_y$—(OE)$_z$—O—DI—(—PEG—DI—)$_n$—O—(OE)$_{x'}$—(OP)$_{y'—(OE)z}$—O—R' "
should read -- R—O—(OE)$_x$—(OP)$_y$—(OE)$_z$—O—DI—(—PEG—DI—)$_n$—O—(OE)$_{x'}$—(OP)$_{y'}$—(OE)$_z$—O—R' --.

Column 38, lines 19-20, " R—O—(OE)$_x$—(OP)$_y$—(OE)$_z$—O—DI—(—PEG—DI)$_n$—O—(OE)$_{x'}$—(OP)$_{y'}$(OE)$_z$—O—R' "
should read -- R—O—(OE)$_x$—(OP)$_y$—(OE)$_z$—O—DI—(—PEG—DI)$_n$—O—(OE)$_{x'}$—(OP)$_{y'}$—(OE)$_z$—O—R' --.

Signed and Sealed this

Eleventh Day of December, 2007

JON W. DUDAS
*Director of the United States Patent and Trademark Office*